United States Patent Office 2,742,687

Patented Apr. 24, 1956

2,742,687

LOW TIN CONTENT, DURABLE, TINNED COPPER CONDUCTOR

Waldemar P. Ruemmler, Dyer, Ind., assignor to the United States of America as represented by the Secretary of the Army No Drawing. Application April 3, 1952, Serial No. 280,377

2 Claims. (Cl. 29—196.4)

This invention relates to coatings for electric conductors and more particularly to substitute coatings for tin on copper wire.

Because tin is a critical material in a time of war or a period of extensive military preparedness, it is essential that its use be minimized as much as possible. A substantial saving in tin can be realized by replacing the tin coatings on copper wire with a non-critical material.

The substitute for the tin coating should possess approximately the same soldering properties as tin and also serve as an adequate barrier between the copper wire and the insulation. In addition, the coating should function satisfactorily in a wide temperature range. To enable the use of the coating in all types of climatic conditions, particularly in tropical exposures, high humidity resistance and resistance to fungal growth are important.

It is known by those skilled in the art that clean copper has excellent solderability. Hence, tinning would not be necessary if it were not for the formation of copper sulphide in those instances where no barrier layer is provided to prevent attack on the copper by the sulphur in rubber insulation and to prevent attack on the copper by atmospheric or other exposure. Therefore, a most necessary function of the barrier between the copper and the insulation is the prevention of attack by constituents in the insulating material, as, for example, the so-called "copper" effect on rubber insulation. Here, the free sulphur in the rubber insulation attacks the copper and the compounds formed and the copper itself react with the rubber to deteriorate it. Where the insulation is of an organic chloride type, such as vinylite, there is the possibility of attack on the copper by chlorine.

It is therefore a primary object of the present invention to provide a coating for copper wire, such coating possessing solderability equivalent to a standard tin coating but effecting a marked saving in tin.

A further object is to provide a coating for copper wire which will be resistant to high humidity corrosion.

A still further object is to provide a coating for copper wire which will be resistant to sulphur attack.

These and other objects and advantages of the present invention will be better understood as the detailed description thereof progresses.

To enable the determination of the best substitute for a coating for copper wire, it is necessary to understand the basic factors which determine the solderability of tinned copper wire using a rosin flux. The following hypothesis has been evolved resulting from the present invention.

The coating on tinned copper wire is composed of one or all of the following films or layers. The outermost surface consists of a film of tin oxide. This film varies in thickness depending upon the degree of porosity and roughness of the tin coating, the time, temperature and atmosphere during aging and the preliminary cleaning treatment before soldering. Beneath this oxide film there lies a layer of tin. The thickness of this layer depends primarily upon the original thickness of the tin deposit but is made thinner depending upon the greater the amount of surface oxidation and the greater the amount of formation of intermetallic compound. Beneath the tin film, there lies a compound layer probably consisting of $Cu_6Sn_5$ in contact with the tin and $Cu_3Sn$ in contact with the copper. This compound layer also varies in thickness being essentially non-existent in freshly electrotinned coatings, being extremely thin for wires aged even prolonged times at room temperature, and achieving appreciable thickness for wires held even for short times at temperatures exceeding the melting point of tin. Thus, the compound layer forms and grows in the soldering area during soldering operation on non-fused electrotinned wires.

The relative as well as the absolute thickness of these layers determine the solderability of tinned copper wire. In the case of a thin oxide film with a little or no free tin beneath it, the solderability is negligible. As the amount of free tin is increased (by means of thicker coatings), the solderability increases within practical limits of tin thickness. With the thicker tin coatings, the mechanism involved during the soldering operation is the breaking and washing away of the oxide film by the combined action of the molten tin beneath the film, the solder, and the rosin. The formation of intermetallic compounds of copper and tin reduces the quantity of free tin beneath the oxide film. Thus, for a critical thickness of free tin, solderability is greatly impaired by compound formation. If the oxide film and free-tin layers are virtually absent, the compound layer may decrease solderability owing to its apparent inherently poorer solderability than that of copper (about 20% less). Therefore, in order to achieve maximum solderability with a minimum of tin, both the formation of the oxide and the layer of intermetallic compounds must be eliminated.

The present invention is based upon the discovery that a very thin coating of tin overlaying a layer of iron upon copper wire will eliminate diffusion of the tin into copper thus reducing the quantity of tin required to coat the copper wire to a small fraction of the usual amount required and the resulting duplex coating will have solderability equal or superior to a coating wholly consisting of tin.

The iron barrier layer is electrodeposited directly upon the copper wire from an alkaline electrolytic bath, containing ferrous chloride, calcium chloride, and sodium tartrate. The concentration of these constituents in the bath and the necessary steps in the electrodeposition as evolved in the present invention are described hereunder.

The wire plated consists of a 33 inch length of sixteen gauge copper wire (0.05082-inch diameter) stretched to 36 inches by means of a vise and a pair of pliers. The cathodes consist of 5 lengths of straightened wire six inches in active cathode length. The wires are so racked that they lie in a vertical plane with their axes 0.75 inch apart. During the plating, the cathode assembly is agitated in the direction of the plane of the wires.

Prior to the plating of the copper wire specimens, they are subjected to a preliminary treatment to insure maximum purity and cleanliness. The steps in this treatment are as follows.

The copper wire specimens are vapor degreased and then electrochemically cleaned by making them one of the electrodes in a bath composition consisting of 75 grams of "Anodex" per liter. The bath is kept at 200° F. throughout the cleaning and a current density of 90 amperes per square foot is maintained during this process. The specimens are electrochemically cleaned as a cathode for 45 seconds and as an anode for 15 seconds.

The next step is to cold rinse the specimens and then dip them for one minute in an acid bath.

The acid bath consists of a solution of 0.5 normal hydrochloric acid and ammonium chloride, the latter in a concentration of 150 grams per liter. The acid bath is kept at 130° F. during the dipping. After the dipping, the specimens are again cold rinsed and then placed as a cathode in an electrolytic solution consisting of 22.5 grams per liter of cuprous cyanide, 30.0 grams per liter of sodium cyanide, 60.0 grams per liter of Rochelle salts, 25 grams per liter of sodium carbonate and 6.0 grams per liter sodium hydroxide. The solution is adjusted to a pH of 12.7 and a current with a density of 30 amperes per square foot is passed through the solution for 3 minutes. The solution is maintained at 150° F. The specimens then are again cold rinsed.

To plate the copper wire with iron, an electrolytic bath consisting of 375 grams per liter of ferrous chloride (tetrahydrate), 185 grams per liter of calcium chloride and 1 gram per liter of sodium tartrate is used. The bath is maintained at a temperature of 175° F. to 200° F. and a pH of 8. The electroplating process consists of passing a current with a density of 30 amperes per square foot through this bath, the prepared copper wire specimens being made the cathode and SAE 10—10 cold-rolled steel plates are used as anodes. After three minutes of plating, the plated specimens are rinsed.

To plate the iron-coated copper wire with tin, an electrolytic bath consisting of 120 grams per liter of sodium stannate, 7.5 grams per liter of sodium hydroxide, 15 grams per liter of sodium acetate, and 0.5 milliliter per liter of hydrogen peroxide is used. The temperature of the bath is maintained at 150° F. to 200° F. and a current density of 15 amperes per square foot is passed through the solution. The iron coated copper specimens are made the cathode and the anodes consist of nickel. A plating time of 10 seconds gives a tin coating thickness of $2.5\times10^{-6}$ inch, 20 seconds gave a thickness of $5\times10^{-6}$ inch, etc. After the plating, the specimens are cold rinsed, rinsed in a 95% alcohol solution and dried with cleaning tissue.

The duplex coatings consisting of an iron barrier layer .00003 inch thick and overlays of tin, .00001 inch and .00002 inch thickness produced by the processes described above were tested with respect to solderability, sulphur resistance, continuity of coating, solderability after aging, high humidity corrosion resistance and adhesion to the underlying copper.

To test solderability a pair of 16 gauge coated wire specimens were clamped in a vise at the ends and twisted together (7 complete turns for 7 inch long specimens). The twisted wires were cut to a 6 inch length. They were then suspended in a solution of 40 grams of wood rosin in 100 cc. of ethyl alcohol and their fluxed ends were suspended with a 0.4 inch immersion in a 50 lead–50 tin solder bath for 30 seconds at 312° C. The wood rosin was removed with xylene and the capillary rise of the solder above the point of contact with the solder bath was measured to the nearest 64th of an inch. The height of the capillary rise of the solder was recorded in multiples of 64th of an inch. Inasmuch as a coating consisting of 0.00002 inch thickness of tin over an iron barrier layer 0.00003 inch showed a solderability of $^{60}/_{64}$ of an inch and a 0.00006 inch standard tin coating had a solderability of $^{62}/_{64}$ of an inch, it is apparent that the former is substantially equivalent in solderability to a tin coating.

In order to determine the resistance of the coating to attack by free sulphur in rubber, the coated wires were vulcanized in a sheet of rubber. A normal and an accelerated (high sulphur rubber) test were employed. The normal rubber was compounded according to a standard formula for cable covering. The high-sulphur rubber contained five times as much sulphur as the normal rubber. The specimens were placed between two sheets of rubber and vulcanized at 290° F. (143° C.) under pressures, for 30 minutes for the normal test and 45 minutes for the accelerated test. The results of this test showed that the duplex coating did not show any blackening by the sulphur and solderability remained good after this test.

To determine continuity of coating, the testing procedure required the following special solutions, the preparation thereof being described below.

A hydrochloric acid solution with a specific gravity of 1.088 was required and this was provided in the following manner. Commercial hydrochloric acid (specific gravity 1.12) was diluted with distilled water to a specific gravity of 1.088 measured at 15.5° C. (60° F.). A 180 milliliter test portion of the dilute acid was considered to be exhausted when ten test specimens of 16 gauge wire were immersed in it for two cycles.

A second test solution required was a 1.142 specific gravity sodium polysulphide solution. This was prepared as follows. A concentrated solution was prepared by dissolving sodium sulphide crystals in distilled water until the solution was saturated at about 21° C. (70° F.), adding about 250 grams per liter of flowers of sulphur and allowing the resulting solution to stand for at least 24 hours. The test solution was made by diluting a portion of the concentrated solution with distilled water to a specific gravity of 1.142 at 15.5° C. (60° F.). This solution had sufficient strength to blacken thoroughly a piece of clean, untinned copper wire in 5 seconds. A portion of the test solution used for testing samples was considered to be exhausted when it failed to blacken a piece of clean copper.

The test for coating continuity consisted of the following steps. A length of at least 4½ inches of clean coated wire specimens was immersed in accordance with the following cycles in the test solutions maintained at temperatures between 15.5° C. and 21° C. (60° F. and 70° F.).

The specimen was first immersed in the hydrochloric acid solution described above, washed, and wiped dry.

It was then immersed for 30 seconds in the sodium polysulphide solution, washed and wiped dry.

After each immersion, the specimens were immediately and thoroughly washed in clean water and wiped dry with a clean soft cloth.

After these operations, the specimens were examined to ascertain if any copper was exposed through openings in the coating as revealed by blackening action of the sodium polysulphide. Such blackening of exposed copper indicated failure of the coating.

The duplex coating which is the present invention when subjected to this test showed satisfactory coating continuity and no blackening was observed.

To test for solderability after aging, the wire specimens were placed in a helium atmosphere at 200° C. for 30 hours. At the end of this period the appearance and adhesion of the coating was noted and then the specimen was again tested for solderability. The duplex coating of tin over iron showed satisfactory results after being subjected to this test, retaining good solderability.

To test resistance to high humidity corrosion, coated wire specimens were exposed to a high humidity atmosphere for 100 hours at a temperature of 105° C. in a corrosion testing box. At the end of this period, the solderability of the specimens remained high.

The test for adhesion of the coating consisted of bending the wire around a rod having a diameter equal to four times the diameter of the wire and dipping the bent portion of the wire in a sodium polysulphide solution (as described herein above in the "Continuity of Coating" test) for 30 seconds. Any cracking or parting of the coating shown by blackening of the copper would have been indicative of failure. The coating which is the present invention gave no indication of cracking or parting when subjected to this test.

In summary, this invention teaches that a duplex coating consisting of a tin coating over an iron barrier layer is a very effective substitute for a tin coating on copper wire, being substantially equivalent to the latter with respect to solderability, sulphur resistance, coating continuity, adhesion and resistance to corrosion caused by high humidity. Thus, with this coating, great savings in tin can be realized.

While there have been described what at present are considered to be preferred embodiments of the invention, it will be understood by those skilled in the art that various changes and modifications may be made herein without departing from the invention and it is therefore aimed in the appended claims to cover all such modifications as fall within the spirit and scope of the invention.

What is claimed is:

1. A tinned copper wire conductor characterized by a markedly low content of tin compared to conventional tinned wire said content being a small fraction of the amount used in conventional tinned wire, and being characterized by inhibition of interfacial chemical and intercrystalline combination of the copper and tin, and being also characterized by the presence of a barrier to chemical deterioration of conventional insulation coating when applied to said conductor; said conductor consisting of a copper wire core base, an electro-deposited iron barrier layer thereon having a thickness of about 0.00003 inch, and a layer of electrodeposited tin on said iron layer having a thickness of between $2.5\times10^{-6}$ and $5\times10^{-6}$ inch.

2. A method of forming a low-cost, moderate weight, readily solderable tinned copper conductor, characterized by being chemically inert to conventional electrical insulating material applied thereover, the tin of said conductor having a markedly low content of tin as compared to conventional tinned coatings on copper conductors and said conductor being characterized by substantial freedom from interfacial combination between the tin and copper; said method consisting in the steps of degreasing a substantially pure copper wire conductor, electrolytically cleaning and smoothing the surface of the conductor as pure copper by alternate cathodic and anodic electrolysis at high temperature and current, electroplating iron directly on the so-prepared copper from an alkaline aqueous electrolyte containing ferrous ion, calcium ion, and a tartrate selected from the group comprising sodium tartrate, potassium tartrate, and ammonium tartrate, by application of a plating current of about 30 amperes per square foot of cathode area for a period of about three minutes; and thereafter electroplating tin on the iron so deposited, from an alkaline aqueous electrolyte containing a stannate from the group consisting of sodium stannate, potassium stannate, and ammonium stannate, said electrolyte containing also a hydroxide selected from the group consisting of sodium hydroxide, potassium hydroxide and ammonium hydroxide, and containing also an acetate selected from the group consisting of sodium acetate, potassium acetate, and ammonium acetate, and containing also hydrogen peroxide, said electroplating of tin from said electrolyte being effected by application of a plating current of approximately fifteen amperes per square feet of wire cathode area for a period of between about ten seconds and about twenty seconds, maintaining the electrolyte at a temperature of between 175° F. and 200° F.; wherein said plating of iron is deposited to a thickness approximating 0.00003 inch, and said plating of tin is deposited to a thickness between about $2.5\times10^{-6}$ inch and about $5\times10^{-6}$ inch.

References Cited in the file of this patent

UNITED STATES PATENTS

| | | |
|---|---|---|
| 863,247 | Yeatman | Aug. 13, 1907 |
| 1,072,091 | Cowper-Coles | Sept. 2, 1913 |
| 1,876,745 | Potter | Sept. 13, 1932 |
| 2,311,138 | Swartz | Feb. 16, 1943 |
| 2,316,917 | Wallace et al. | Apr. 20, 1943 |
| 2,445,858 | Mitchell et al. | July 27, 1948 |
| 2,472,296 | Hartnell | June 7, 1949 |
| 2,509,117 | Wallace | May 23, 1950 |

FOREIGN PATENTS

| | | |
|---|---|---|
| 289,954 | Italy | Nov. 3, 1931 |

OTHER REFERENCES

Metal Industry, April 1939, pp. 161–164. (Copy in Patent Office Library.)

Transactions Electrochemical Society, vol. 80, 1941, pp. 617–629.